US010941071B2

(12) United States Patent
Gross (10) Patent No.: US 10,941,071 B2
(45) Date of Patent: Mar. 9, 2021

(54) HYBRID SODA-LIME SILICATE AND ALUMINOSILICATE GLASS ARTICLES

(71) Applicant: CORNING INCORPORATED, Corning, NY (US)

(72) Inventor: Timothy Michael Gross, Waverly, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/331,753

(22) Filed: Jul. 15, 2014

(65) Prior Publication Data

US 2015/0037586 A1  Feb. 5, 2015

Related U.S. Application Data

(60) Provisional application No. 61/861,667, filed on Aug. 2, 2013.

(51) Int. Cl.
  C03C 3/097  (2006.01)
  C03C 3/087  (2006.01)
  C03C 4/18   (2006.01)
  C03C 21/00  (2006.01)

(52) U.S. Cl.
  CPC .............. *C03C 3/097* (2013.01); *C03C 3/087* (2013.01); *C03C 4/18* (2013.01); *C03C 21/002* (2013.01); *C03C 2204/00* (2013.01); *Y10T 428/315* (2015.01)

(58) Field of Classification Search
  None
  See application file for complete search history.

(56) References Cited

U.S. PATENT DOCUMENTS

| | | | |
|---|---|---|---|
| 4,192,689 A | 3/1980 | Rinehart | |
| 5,277,946 A * | 1/1994 | Nagai et al. | 428/426 |
| 6,251,812 B1 * | 6/2001 | Koyama et al. | 501/69 |
| 6,306,786 B1 * | 10/2001 | Koyama et al. | 501/69 |
| 6,333,286 B1 * | 12/2001 | Kurachi et al. | 501/69 |
| 6,340,647 B1 * | 1/2002 | Koyama et al. | 501/69 |
| 2009/0197088 A1 | 8/2009 | Murata | |
| 2009/0298669 A1 * | 12/2009 | Akiba et al. | 501/70 |
| 2010/0035745 A1 | 2/2010 | Murata | |
| 2011/0267697 A1 * | 11/2011 | Kohli | C03C 15/00 359/609 |
| 2011/0274916 A1 | 11/2011 | Murata | |
| 2012/0015197 A1 | 1/2012 | Sun et al. | |
| 2012/0171497 A1 | 7/2012 | Koyama et al. | |
| 2012/0196110 A1 | 8/2012 | Murata et al. | |
| 2012/0219792 A1 | 8/2012 | Yamamoto et al. | |
| 2013/0011650 A1 | 1/2013 | Akiba et al. | |
| 2013/0323468 A1 * | 12/2013 | Myers | C03C 17/007 428/143 |
| 2014/0170380 A1 * | 6/2014 | Murata | C03C 3/087 428/141 |

FOREIGN PATENT DOCUMENTS

| | | |
|---|---|---|
| DE | 69900721 | 8/2002 |
| GB | 1212123 | 11/1970 |
| GB | 1214666 | 12/1970 |
| JP | 201030876 | 2/2010 |
| JP | 2010059038 | 3/2010 |
| JP | 4527876 | 6/2010 |
| JP | 5152706 | 12/2012 |
| JP | 201335721 | 2/2013 |
| KR | 1218650 | 12/2012 |
| KR | 1236374 | 2/2013 |
| WO | WO201114981 | 12/2011 |
| WO | WO2012099053 | 7/2012 |
| WO | WO2013005608 | 1/2013 |
| WO | WO2013006301 | 1/2013 |
| WO | WO2013027675 | 2/2013 |
| WO | WO2013030848 | 3/2013 |
| WO | WO2013047679 | 4/2013 |

OTHER PUBLICATIONS

Abstract of JP2010059038.
PCT/US2014/048999 Search Report.

* cited by examiner

*Primary Examiner* — David Sample (74) *Attorney, Agent, or Firm* — Kevin M. Johnson (57) ABSTRACT

A glass article is provided having from greater than or equal to about 40 mol % to less than or equal to about 68 mol % $SiO_2$, less than or equal to about 11 mol % $Al_2O_3$, an $R_2O:R'O$ molar ratio of from greater than or equal to about 1:1 to less than or equal to about 2:1, and an MgO:CaO molar ratio of from greater than or equal to about 0.6:1 to less than or equal to about 1.8:1. The class article may also include a compressive stress layer on at least one surface thereof, the compressive stress layer having a compressive stress that is greater than or equal to about 800 MPa, and a depth that is greater than or equal to about 20 μm.

12 Claims, 1 Drawing Sheet

HYBRID SODA-LIME SILICATE AND ALUMINOSILICATE GLASS ARTICLES

This application claims the benefit of priority under 35 U.S.C. § 119 of U.S. Provisional Application Ser. No. 61/861,667 filed on Aug. 2, 2013 the content of which is relied upon and incorporated herein by reference in its entirety.

BACKGROUND

Field

The present specification generally relates to hybrid soda-lime silicate and aluminosilicate glass articles and, more specifically, to ion exchangeable hybrid soda-lime silicate and aluminosilicate glass articles.

Technical Background

Soda-lime silicate glasses have been known for some time and are easily made by cost-effective methods, such as, for example, float methods. Further, the raw materials used in soda-lime silicate glasses are inexpensive when compared to raw materials in other types of glasses. However, soda-lime silicate glasses do not provide the mechanical strength and other properties required by current electronic devices, such as cellular phones, tablet computers, laptop computers, etc. Conversely, aluminosilicate glasses, particularly ion-exchanged aluminosilicate glasses, have ample mechanical strength and chemical stability to be used in current electronic devices, but require high-cost methods and raw materials to produce when compared to soda-lime silicate glasses.

Therefore, a need exists for glass articles with alternative glass compositions that balance the low-cost characteristics of soda-lime silicate glass and the high-performance characteristics of aluminosilicate glasses.

SUMMARY

According to embodiments, a glass article is provided comprising from greater than or equal to about 40 mol % to less than or equal to about 68 mol % $SiO_2$, less than or equal to about 11 mol % $Al_2O_3$, an $R_2O:R'O$ molar ratio of from greater than or equal to about 1:1 to less than or equal to about 2:1, and an MgO:CaO molar ratio of from greater than or equal to about 0.6:1 to less than or equal to about 1.8:1. The class article may also comprise a compressive stress layer on at least one surface thereof, the compressive stress layer having a compressive stress that is greater than or equal to about 800 MPa.

According to some embodiments, a glass article is provided comprising from greater than or equal to about 40 mol % to less than or equal to about 68 mol % $SiO_2$, less than or equal to about 11 mol % $Al_2O_3$, from greater than or equal to about 13 mol % to less than or equal to about 21 mol % $R_2O$, greater than or equal to about 2.5 mol % CaO, and an $R_2O:R'O$ molar ratio of from greater than or equal to about 1:1 to less than or equal to about 2:1. The glass article may comprise a compressive stress layer on at least one surface thereof, the compressive stress layer having a compressive stress that is greater than or equal to about 800 MPa and a depth that is greater than or equal to about 20 μm.

Additional features and advantages will be set forth in the detailed description which follows, and in part will be readily apparent to those skilled in the art from that description or recognized by practicing the embodiments described herein, including the detailed description which follows, the claims, as well as the appended drawing.

It is to be understood that both the foregoing general description and the following detailed description describe various embodiments and are intended to provide an overview or framework for understanding the nature and character of the claimed subject matter. The accompanying drawing is included to provide a further understanding of the various embodiments, and is incorporated into and constitutes a part of this specification. The drawing illustrates various embodiments described herein, and together with the description serves to explain the principles and operations of the claimed subject matter.

DETAILED DESCRIPTION

Reference will now be made in detail to various embodiments of glass articles comprising glass compositions that exhibit improved strength over known soda-lime silicate glasses and can be made cost-effectively. Such glass articles are suitable for use in a wide variety of applications. The glass articles may also be chemically strengthened, such as through an ion-exchange process, thereby imparting increased mechanical durability to the glass. The glass articles described herein generally have glass compositions comprising silica ($SiO_2$), alumina ($Al_2O_3$), divalent cation oxides, such as MgO, CaO, SrO, BaO, and/or ZnO (collectively referred to herein as R'O), and alkali oxides, such as $Na_2O$ and/or $K_2O$ (collectively referred to herein as $R_2O$) in amounts which allow the glass articles to be manufactured in a cost-effective manner and also allow the glass articles to be chemically strengthened to high levels. The alkali oxides present in the glass compositions may facilitate chemically strengthening the glass articles by ion exchange. Various embodiments of the glass articles ad glass compositions will be described herein and further illustrated with reference to specific examples.

In the embodiments of the glass articles and glass compositions described herein, the concentrations of constituent components (e.g., $SiO_2$, $Al_2O_3$, $R_2O$, R'O, and the like) are specified in mole percent (mol %) on an oxide basis, unless otherwise specified.

The terms "free" and "substantially free," when used to describe the concentration and/or absence of a particular constituent component in a glass composition, means that the constituent component is not intentionally added to the glass composition. However, the glass composition may contain traces of the constituent component as a contaminant in amounts of less than 0.10 mol %.

The glass compositions described herein are hybrids between soda-lime silicate glass compositions and aluminosilicate glass compositions. The glass compositions generally include a combination of $SiO_2$, $Al_2O_3$, one or more divalent cation oxides, R'O, (such as MgO, CaO, SrO, BaO, and/or ZnO), and one or more alkali oxides, $R_2O$, (such as $Na_2O$ and/or $K_2O$). Some embodiments of the glass composition include $P_2O_5$. In some embodiments, the glass compositions are free or substantially free from boron, lithium, and/or barium and compounds containing boron, lithium, and/or barium. The combination of these components provides a glass article that may be produced at a relatively low cost and is also suitable for chemical strengthening, such as by ion exchange. In some embodiments the glass compositions further comprise small amounts of one or more additional oxides such as, for example, $SnO_2$, $ZrO_2$, $TiO_2$, $As_2O_3$, $Sb_2O_3$ or the like. These components may be added as fining agents and/or to enhance the chemical durability of the glass article.

In embodiments of the glass articles described herein $SiO_2$ is the largest constituent of their composition and, as such, is the primary constituent of the resulting glass network. $SiO_2$ provides durability to the glass article. Accordingly, a relatively high $SiO_2$ concentration is generally desired. However, if the amount of $SiO_2$ is too high, the formability of the glass article may be diminished as higher concentrations of $SiO_2$ may increase the difficulty of melting the glass composition which, in turn, adversely impacts the formability of the glass article. In embodiments described herein, the glass composition generally comprises $SiO_2$ in an amount greater than or equal to about 50 mol % and less than or equal to about 68 mol %, or even less than or equal to about 66 mol %. In some embodiments, the amount of $SiO_2$ in the glass composition is greater than or equal to about 50 mol %, or even greater than or equal to about 57 mol %. In some embodiments the amount of $SiO_2$ in the glass composition is greater than or equal to about 59 mol %. For example, in some embodiments, the glass composition includes from greater than or equal to about 50 mol % to less than or equal to about 68 mol % $SiO_2$. In some other embodiments the glass composition includes from greater than or equal to about 57 mol % to less than or equal to about 67 mol % $SiO_2$, or even from greater than or equal to about 59 mol % to less than or equal to about 64 mol % $SiO_2$.

The glass articles described herein further include $Al_2O_3$. $Al_2O_3$, in conjunction with alkali oxides present in the glass composition, improves the susceptibility of the glass article to ion exchange strengthening. If the amount of $Al_2O_3$ in the glass composition is too high, the viscosity of the glass composition increases and high temperatures may be needed to form the glass composition into a glass article, thereby increasing cost and manufacturing time. In addition, when the amount of $Al_2O_3$ is too high, the thermal expansion coefficient is lowered. However, if the amount of $Al_2O_3$ in the glass composition is too low, the desired compressive stress may not be achieved during ion exchange. Accordingly, the glass compositions described herein generally include $Al_2O_3$ in an amount from greater than or equal to about 7 mol % to less than or equal to about 11 mol %. In some embodiments, the amount of $Al_2O_3$ in the glass composition is from greater than or equal to about 8 mol % to less than or equal to about 10 mol %. In some other embodiments, the amount of $Al_2O_3$ in the glass composition is about 9 mol %.

The glass articles also include one or more alkali oxides. The alkali oxides ($R_2O$) facilitate the ion exchangeability of the glass composition and, as such, facilitate chemically strengthening the glass article. In some embodiments, the alkali oxide present in the glass composition includes $Na_2O$ and/or $K_2O$ (i.e., "R" is Na and/or K). In embodiments, $R_2O$ is present in the glass composition in a total concentration of from greater than or equal to about 13 mol % to less than or equal to about 21 mol %. In some other embodiments, $R_2O$ is present in the glass composition in a total concentration of from greater than or equal to about 13 mol % to less than or equal to about 19 mol %, or even from greater than or equal to about 14 mol % to less than or equal to about 18 mol %. In yet other embodiments, $R_2O$ is present in the glass composition in a total concentration of from greater than or equal to about 15 mol % to less than or equal to about 17 mol %, or even present at about 16 mol %.

The ion exchangeability of the glass article is, in part, imparted to the glass article by the amount of $Na_2O$ initially present in the glass composition prior to ion exchange. Accordingly, in embodiments of the glass articles described herein, the alkali oxide present in the glass composition includes at least $Na_2O$. Specifically, $Na_2O$ may help achieve the desired compressive strength and depth of layer in the glass article upon ion exchange strengthening. Embodiments of the glass composition include $Na_2O$ in an amount from about 12 mol % to about 20 mol %. In some embodiments the glass composition includes $Na_2O$ in an amount from greater or equal to than about 14 mol %, such as from greater than or equal to about 15 mol % to less than or equal to about 18 mol %. In other embodiments the glass composition includes $Na_2O$ in an amount from greater than or equal to about 16 mol % to less than or equal to about 17 mol %. If the amount of $Na_2O$ in the glass composition is too low, the ion exchange in the glass composition may not be adequate. However, if the amount of $Na_2O$ in the glass composition is too high, the thermal expansion coefficient of the glass article may increase to unacceptable levels.

As noted above, the alkali oxide in the composition article may further include $K_2O$. The amount of $K_2O$ present in the glass composition also relates to the ion exchangeability of the glass article and may increase the depth of the compressive stress layer. However, as the amount of $K_2O$ present in the glass composition increases, the compressive stress obtainable through ion exchange decreases as a result of the exchange of potassium and sodium ions. Accordingly, it may be desirable to limit the amount of $K_2O$ present in the glass composition. In some embodiments, the amount of $K_2O$ in the glass composition is from greater than or equal to about 1.0 mol % to less than or equal to about 3.5 mol %, or even from greater than or equal to about 1.5 mol % to less than or equal to about 3.0 mol %. In some embodiments, the amount of $K_2O$ in the glass composition is from greater than or equal to about 1.8 mol % to less than or equal to about 2.8 mol %, or even present at about 2.0 mol %.

The amount of $Al_2O_3$ and $R_2O$ present in the glass composition may also be expressed as a ratio of $R_2O$ to $Al_2O_3$. In some embodiments, the ratio $R_2O:Al_2O_3$ in the glass composition is from greater than or equal to about 1.3:1 to less than or equal to about 2.3:1 to facilitate the susceptibility of the glass article to ion exchange strengthening. Specifically, the diffusion coefficient or diffusivity of the glass article relates to the rate at which alkali ions penetrate into the glass article surface during ion exchange. A glass composition that has a ratio $R_2O:Al_2O_3$ greater than or equal to about 1.3:1 may have a greater diffusivity than glass article that has a ratio $R_2O:Al_2O_3$ less than about 1.3:1. A glass article in which the alkali ions have a greater diffusivity can obtain a greater depth of layer for a given ion exchange time and ion exchange temperature than glass article in which the alkali ions have a lower diffusivity. Moreover, as the ratio of $R_2O:Al_2O_3$ increases, the strain point, anneal point, and softening point of the glass article decrease, such that the glass article is more readily formable. In addition, for a given ion exchange time and ion exchange temperature, it has been found that compressive stresses induced in a glass article that has a ratio $R_2O:Al_2O_3$ of from greater than or equal to about 1.3:1 to less than or equal to about 2.3:1 are generally greater than those generated in a glass article in which the ratio $R_2O:Al_2O_3$ is less than 1.3:1 or greater than 2.3:1. Accordingly, in some embodiments, the ratio of $R_2O:Al_2O_3$ is from greater than or equal to about 1.5:1 to less than or equal to about 2.1:1, or even from greater than or equal to about 1.7:1 to less than or equal to about 1.9:1.

The divalent cation oxides (R'O), such as MgO, CaO, SrO, BaO, and ZnO, present in the glass composition may improve the meltability of the glass article, the susceptibility of the glass article to ion exchange, and the depth of the compressive stress layer in the glass article. However, when the amount of R'O in the glass composition becomes too high, the susceptibility of the glass article to ion exchange may decrease, and the thermal expansion coefficient may increase to unacceptable levels. In some embodiments described herein, the glass composition includes R'O in amounts from greater than or equal to about 7 mol % to less than or equal to about 17 mol %, or even from greater than or equal to about 9 mol % to less than or equal to about 15 mol %. In other embodiments the glass composition includes R'O in amounts from greater than or equal to about 10 mol % to less than or equal to about 14 mol %, or even from greater than or equal to about 11 mol % to less than or equal to about 13 mol %.

MgO may lower the viscosity of a glass composition at high temperatures thereby enhancing the meltability and the formability of the glass article, and/or enhance the Young's modulus. MgO may also improve the ion exchange susceptibility of the glass article and, in particular, MgO may increase the depth of the compressive stress layer when compared to other alkaline earth metal oxides. In some embodiments, the amount of MgO in the glass composition is from greater than or equal to about 4 mol % to less than or equal to about 9 mol %, or even from greater than or equal to about 5 mol % to less than or equal to about 8 mol %. In other embodiments, the amount of MgO in the glass composition is from greater than or equal to about 6 mol % to less than or equal to about 7 mol %.

CaO may lower the viscosity of a glass composition at high temperatures thereby enhancing the meltability and the formability of the glass article, and/or enhance the Young's modulus. CaO may also improve the ion exchange susceptibility of the glass article and, in particular, CaO may increase the compressive stress of the compressive stress layer when compared to other alkaline earth metal oxides, including MgO. However, when the amount of CaO in the glass composition becomes too high, the depth of the compressive stress layer may be decreased. Accordingly, in some embodiments, the amount of CaO in the glass composition is from greater than or equal to about 2.5 mol % to less than or equal to about 8.0 mol %, such as greater than or equal to about 3.0 mol % to less than or equal to about 7.0 mol %. In some embodiments, the amount of CaO in the glass composition is from greater than or equal to about 4.0 mol % to less than or equal to about 7.0 mol %. In other embodiments, the amount of CaO in the glass composition is from greater than or equal to about 5.0 mol % to less than or equal to about 6.0 mol %.

In some embodiments described herein the glass composition contains relatively high levels of CaO when compared to the concentration of the other alkaline earth oxides in the glass composition including, without limitation, MgO. Specifically, articles formed from glass compositions having high levels of CaO may have higher compressive stresses in the compressive stress layers than glass articles that do not contain such high levels of CaO. However, CaO may lower the diffusivity of alkali metal ions in the glass composition upon ion exchange, which may inhibit the formation of a deeper depth of the compressive stress layer in the glass article. Conversely, MgO increases diffusivity of alkali metal ions into the glass article upon ion exchange, thereby providing deeper depths of the compressive stress layer in the glass. However, MgO may not provide the high levels of compressive stress that CaO is capable of providing. Thus, balancing the amount of CaO and MgO in the glass composition may provide a balance between depth of the compressive stress layer and the compressive stress of the compressive stress layer.

In order to fully realize the benefits of both MgO and CaO in the glass compositions described herein, the molar ratio of MgO to CaO is balanced to provide the desired depth of layer and compressive stress. In embodiments, the molar ratio of MgO:CaO is from greater than or equal to about 0.6:1 to less than or equal about 1.8:1, such as from greater than or equal about 0.8:1 to less than or equal about 1.7:1. In some embodiments the molar ratio of MgO:CaO is from greater than or equal about 0.7:1 to less than or equal about 1.6:1.

To achieve the beneficial properties of soda-lime and aluminosilicate glasses, the amount of alkali metal oxides ($R_2O$) and the divalent cation oxides (R'O) in the glass composition may be balanced. Accordingly, in embodiments, the molar ratio of $R_2O$:R'O in the glass composition is from about 1:1 to about 2:1, or even from about 1.2:1 to about 1.8:1. In some other embodiments the molar ratio of $R_2O$:R'O in the glass composition is from about 1.3:1 to about 1.7:1, or even from about 1.4:to about 1.6:1. In contrast, soda-lime silicate glasses generally have an $R_2O$:RO ratio greater than 1:1, and aluminosilicate glasses generally have an $R_2O$:RO ratio greater than 2:1. High levels of divalent cation oxides relative to $R_2O$ may yield improved compression stress; however, if R'O exceeds $R_2O$ then diffusivity may be greatly reduced.

In some embodiments of the glass compositions described herein, the glass compositions may also include $P_2O_5$. $P_2O_5$ may enhance the ion exchange performance of a glass article and, in particular, may increase the depth of the compressive stress layer. However, when the amount of $P_2O_5$ becomes too high, opalization and/or phase separation may occur, such as in the presence of high field strength divalent cations, such as, for example, MgO and CaO. Accordingly, small amounts of $P_2O_5$ that will not result in opalization and/or phase separation may be added to the glass composition to increase the depth of the compressive stress layer. In some embodiments, no $P_2O_5$ is present in the glass compositions. However, in other embodiments the amount of $P_2O_5$ in the glass composition is greater than or equal to about 0.10 mol % to less than or equal to about 0.75 mol %, or even greater than or equal to about 0.20 mol % to less than or equal to about 0.60 mol %. In some embodiments, the amount of $P_2O_5$ in the glass composition is greater than or equal to about 0.25 mol % to less than or equal to about 0.55 mol %, or even greater than or equal to about 0.30 mol % to less than or equal to about 0.50 mol %.

The amount of $P_2O_5$ in the glass compositions may also be determined as a molar ratio of $P_2O_5$ to R'O. In embodiments, the glass composition has a $P_2O_5$:R'O molar ratio from greater than or equal to about 0.0:1 to less than or equal to about 0.05:1, or even greater than or equal to about 0.01:1 to less than or equal to about 0.04:1. In other embodiments, the glass composition has a $P_2O_5$:R'O molar ratio from greater than or equal to about 0.02:1 to less than or equal to about 0.03:1. With relatively high concentrations of R'O (such as, for example, MgO and CaO), in embodiments the ratio of $P_2O_5$ to R'O may be kept low to prevent phase separation and/or opalization.)

In addition to the $SiO_2$, $Al_2O_3$, $R_2O$, and R'O, the glass compositions described herein may optionally include one or more fining agents such as, for example, $SnO_2$, $As_2O_3$, $Sb_2O_3$, and $Cl^-$ (from NaCl or the like). In embodiments, the sum of all fining agents in the glass composition is an amount from greater than or equal to about 0.01 mol % to less than or equal to about 1.0 mol %, or even from greater than or equal to about 0.02 mol % to less than or equal to about 0.8 mol %. In other embodiments, the sum of all fining agents in the glass composition is an amount from greater than or equal to about 0.03 mol % to less than or equal to about 0.07 mol %, or even from greater than or equal to about 0.04 mol % to less than or equal to about 0.06 mol %. For example, in some embodiments the glass composition includes $SnO_2$ as a fining agent. In these embodiments $SnO_2$ is present in the glass composition in an amount from about 0.001 mol % to about 0.20 mol %, or even from about 0.002 mol % to about 0.10 mol %.

Moreover, the glass articles described herein may include one or more additional metal oxides to further improve the susceptibility of the glass article to ion exchange. For example, the glass composition may further include ZnO, $TiO_2$, and/or $ZrO_2$. In these embodiments, when the additional metal oxide is $TiO_2$ or $ZrO_2$, the $TiO_2$ or $ZrO_2$ is present in an amount that is greater than or equal to 0 mol % and less than or equal to about 2 mol %. When the additional metal oxide is ZnO, the ZnO is present in an amount greater than or equal to 0 mol % and less than or equal to about 7 mol %. $TiO_2$ and $ZrO_2$ may lower the melting temperature of the glass, thereby enhancing the ion-exchange properties, and improving durability. Both $ZrO_2$ and $TiO_2$ may nucleate crystals in the glass and, thus, in embodiments high concentrations of these metal oxides may be avoided.

Figure 1:
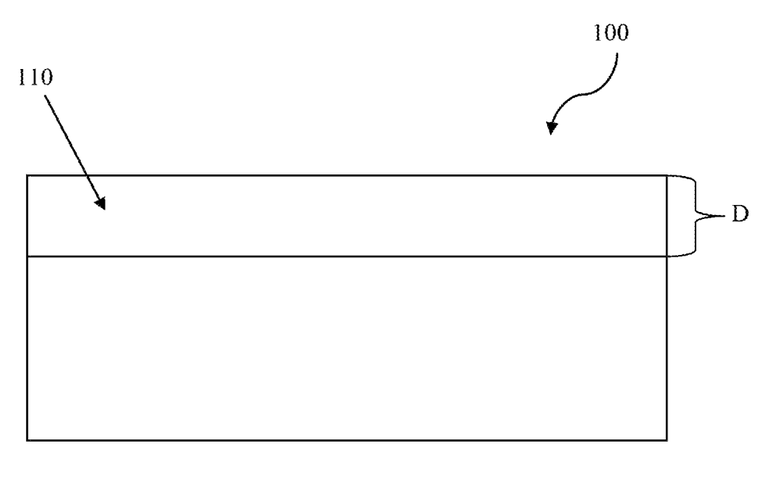
FIG. 1 schematically depicts a glass article with a compressive stress layer on a surface thereof.

As noted above, the presence of alkali oxides in the glass composition facilitates chemically strengthening the glass article by ion exchange. Specifically, alkali ions, such as potassium ions, sodium ions, and the like, are sufficiently mobile in the glass article to facilitate ion exchange. Referring now to FIG. 1, a compressive stress layer 110 may be formed in the glass article 100 by exposing the glass article to a molten salt bath of 100% $KNO_3$ (or a mixed salt bath of greater than 80 weight percent $KNO_3$ and the balance $NaNO_3$) for a time period of less than or equal to 20 hours, or even less than or equal to 8 hours, at a temperature less than or equal to 500° C. or even less than or equal to 450° C. In some embodiments, the time period for achieving the desired depths of layers and compressive stresses is less than or equal to 4 hours or even less than or equal to 3.5 hours. The temperature for achieving the desired depths of layers and compressive stresses may be less than or equal to 470° C. or even less than or equal to 350° C.

In some embodiments, the glass article is ion exchangeable to form a compressive stress layer 110 having a depth D of greater than or equal to 20 µm. In some embodiments, the depth D of the layer 110 is greater than or equal to about 25 µm, or even greater than or equal to about 30 µm. In some other embodiments, the depth D of the layer 110 is greater than or equal to 35 µm. In still other embodiments, the depth D of layer 110 is less than or equal to about 80 µm, or even less than or equal to about 70 µm. In other embodiments, the depth D of layer 110 is less than or equal to about 60 µm, or even less than or equal to about 50 µm. Accordingly, in some embodiments, the depth D of the layer 110 is from greater than or equal to about 20 µm to less than or equal to about 80 µm, or even from greater than or equal to about 25 µm to less than or equal to about 70 µm. In some other embodiments, the depth D of the layer 110 is from greater than or equal to about 30 µm to less than or equal to about 60 µm, or even from greater than or equal to about 35 µm to less than or equal to about 50 µm. The greater the depth D of a compressive stress layer, the more difficult it is to crack the glass article even after a flaw has been introduced into the glass article at the surface of the glass article. On the other hand, it may become difficult to cut the glass article as the depth D of the compressive stress layer 110 increases, and the internal tensile stress may increase. To increase the thickness of the compressive stress layer, the amount of $K_2O$ and/or $P_2O_5$ may be increased, or the amount of CaO may be decreased with a corresponding increase in MgO. Further, the depth D of the compressive stress layer 110 may be increased by lengthening the time of the ion exchange process, or by raising the temperature of an ion exchange solution.

In some embodiments the associated compressive stress of the compressive stress layer 110 is greater than or equal to about 800 MPa, such as greater than or equal to 850 MPa. In some embodiments, the associated compressive stress of the compressive stress layer 110 is greater than or equal to about 900 MPa, or even greater than or equal to about 950 MPa after the glass article is ion exchanged. In some embodiments, the associated surface compressive stress of the compressive stress layer 110 is less than or equal to about 1,500 MPa, less than or equal to about 1,250 MPa, or even less than or equal to about 1,100 MPa. Accordingly, in embodiments, the associated compressive stress of the compressive stress layer 110 is from greater than or equal to about 800 MPa to less than or equal to about 1,500 MPa, or even from greater than or equal to about 850 MPa to less than or equal to about 1,250 MPa. In some other embodiments the compressive stress of the compressive stress layer may be from greater than or equal to about 900 MPa to less than or equal to about 1,100 MPa, or even from greater than or equal to about 950 MPa to less than or equal to about 1,050 MPa. The larger the compressive stress, the greater the mechanical strength of the glass article. To increase the compressive stress, the amount of $Al_2O_3$ and/or CaO may be increased. Alternatively, it may be advantageous to shorten the time of the ion exchange process, or to decrease the temperature of an ion exchange solution.

According to embodiments, the above ion exchange characteristics can be achieved when the glass article has a threshold diffusivity of greater than or equal to about $1.4 \times 10^{-11}$ cm²/s at a temperature greater than or equal to about 410° C. The threshold diffusivity is a measure of the mobility of the alkali ions in the glass article and, as such, generally describes the amenability of the glass article to strengthening by ion exchange. Diffusivity may be calculated using the following equation:

$$\frac{\left(\frac{DOL}{2.8}\right)^2}{t}$$

Where DOL is the depth of the ion-exchanged layer and t is the time of the ion exchange treatment.

Embodiments of the glass article described herein have a strain point greater than or equal to about 525° C. and less than or equal to about 575° C. Embodiments of the glass article also have an anneal point greater than or equal to about 570° C. and less than or equal to about 620° C., and a softening point greater than or equal to about 765° C. and less than or equal to about 830° C. When the strain point of a glass article is high, the heat resistance of the glass article is improved, and even if a thermal treatment is performed on the glass article, the compressive stresses within the compressive stress layer do not relax during elevated temperature exposure below the strain point. Also, when the strain point of the glass article is high, stress relaxation does not occur during ion exchange, thus a high compressive stress can be obtained.

In embodiments described herein the glass article has a coefficient of thermal expansion (CTE) of less than about $97 \times 10^{-7}$° $C.^{-1}$ or even less than about $95 \times 10^{-7}$° $C.^{-1}$ in the temperature range of 25° C. to 300° C. These lower CTE values may allow the glass article to better survive thermal cycling or thermal stress conditions relative to glass articles with higher CTEs.

In embodiments, the liquidus temperature of the glass is less than or equal to about 1,100° C., less than or equal to about 1,070° C., or even less than or equal to about 1,040° C.

In embodiments, the temperature at which the glass composition has a corresponding viscosity of 10,000 poise is from greater than or equal to about 1,000° C. to less than or equal to about 1,200° C., such as from greater than or equal to about 1,050° C. to less than or equal to about 1,150° C. In some embodiments, the temperature at which the glass composition has a corresponding viscosity of 10,000 poise is about 1,100° C. When the temperature corresponding to a glass viscosity of 10,000 poise is lower, the kiln may be operated at a lower temperature, and the amount of trapped gas bubbles produced in the glass article may be lowered. Further, according to embodiments, the temperature of the glass at a viscosity of 10,000 poise may be such that the glass article may be formed by lower-cost methods, such as float, roll-out, and press methods.

In some embodiments, the glass articles formed from the glass compositions described herein have a Young's modulus of greater than or equal to about 70 GPa, such as greater than or equal to about 73 GPa. In some embodiments the glass has a Young's modulus of less than or equal to 80 GPa, or even less than or equal to about 77 GPa. Glass articles that have a relatively high Young's modulus, as described herein, generally resist deformation upon application of an applied stress. Glass articles with relatively high Young's moduli may be used in a variety of applications including, without limitation, as cover glasses in electronic devices.

In embodiments the glass article has a Vickers Hardness of from about 540 kgf/mm² to about 640 kgf/mm², such as from about 560 kgf/mm² to about 620 kgf/mm². In other embodiments, the glass article has a Vickers Hardness of from about 580 kgf/mm² to about 600 kgf/mm².

According to embodiments, the glass articles described herein may be formed by mixing a batch of glass raw materials (e.g., powders of $SiO_2$, $Al_2O_3$, alkali oxides, divalent cation oxides, and the like) such that the batch of glass raw materials has the desired composition. Thereafter, the batch of glass raw materials is heated to form a molten glass composition that is subsequently cooled and solidified to form the glass article. During solidification (i.e., when the glass composition is plastically deformable) the glass composition may be shaped using standard forming techniques to shape the glass composition into a desired final form. Alternatively, the glass composition may be shaped into a stock form, such as a sheet, tube or the like, and subsequently reheated and formed into the desired final form. Any suitable process may be used to form the glass article, such as, for example down draw methods (a slot down method and a re-draw method), a float method, a roll out method, and a press method.

The glass articles described herein may have varying transparency, translucency, and color (or lack thereof). For example, additional additives to the glass composition can change the optical properties of the glass article. The glass without compositional additives may be substantially clear and colorless as measured by the transmission and absorption spectra using visible light.

EXAMPLES

Embodiments will be further clarified by the following examples.

Examples 1-12

Examples 1-12 show glass compositions made in accordance with embodiments disclosed herein. The glass compositions were prepared by mixing raw materials to obtain the desired mole % of components listed in Table 1 below. The raw materials included sand, alumina, aluminum metaphosphate, sodium carbonate, potassium carbonate, magnesia, and limestone. Batches of 2,500 g of these raw materials were mixed and melted overnight at 1,650° C. in a covered platinum crucible and then poured onto a clean steel table. The resulting melt was then annealed overnight at 600 to 625° C. After the glass articles were formed, they were heat-treated overnight at the measured annealing temperature and exposed to baths of 100% refined $KNO_3$ at a temperature of either 410° C., 430° C., or 450° C. for eight hours. Various properties of the glasses were measured, including surface compressive stress and depth of the compressive stress layer (DOL). The results of those measurements are indicated in Table 1 below. The compressive stress (CS) and depth of layer (DOL) were measured using an Orihara FSM with corrected stress optical coefficients for the each glass composition.

TABLE 1

|  | Ex. 1 | Ex. 2 | Ex. 3 | Ex. 4 | Ex. 5 | Ex. 6 |
|---|---|---|---|---|---|---|
| Analyzed mol % |  |  |  |  |  |  |
| $SiO_2$ | 62.1 | 59.4 | 67.0 | 64.5 | 61.0 | 57.9 |
| $Al_2O_3$ | 9.0 | 11.0 | 7.1 | 9.1 | 8.9 | 10.7 |
| MgO | 5.6 | 6.0 | 6.4 | 6.5 | 5.9 | 6.4 |
| CaO | 7.0 | 7.3 | 4.0 | 4.0 | 7.2 | 7.7 |
| $Na_2O$ | 14.4 | 14.4 | 13.6 | 14.1 | 14.8 | 15.3 |
| $K_2O$ | 1.9 | 1.8 | 1.9 | 1.9 | 2.0 | 1.9 |
| $P_2O_5$ | 0.0 | 0.0 | 0.0 | 0.0 | 0.2 | 0.2 |
| $R_2O$:R'O | 1.29 | 1.22 | 1.48 | 1.53 | 1.29 | 1.22 |
| MgO:CaO | 0.81 | 0.82 | 1.62 | 1.62 | 0.81 | 0.84 |

TABLE 1-continued

|  | | | | | | |
|---|---|---|---|---|---|---|
| P$_2$O$_5$:R'O | 0.00 | 0.00 | 0.00 | 0.00 | 0.02 | 0.02 |
| Density (g/cm3) | 2.524 | 2.527 | 2.482 | 2.491 | 2.518 | 2.529 |
| CTE * 10$^{-7}$ (1/° C.) | 94.9 | 93.3 | 90 | 91.3 | 93.7 | 95.1 |
| Strain Pt. (° C.) | 540 | 559 | 531 | 546 | 547 | 562 |
| Anneal Pt. (° C.) | 585 | 602 | 577 | 591 | 591 | 606 |
| Softening Pt. (° C.) | 773.3 | 801 | 783.1 | 799 | 782.1 | 799.1 |
| Temperature (° C.) at Viscosity (poise) | | | | | | |
| 200 | 1433 | 1455 | 1498 | 1497 | 1439 | 1441 |
| 35000 | 1022 | 1052 | 1049 | 1064 | 1028 | 1039 |
| 160000 | 949 | 981 | 971 | 985 | 955 | 967 |
| 10000 | 1093 | 1123 | 1126 | 1141 | 1101 | 1110 |
| Liquidus Temperature (° C.) | 1050 | 1060 | 1040 | 1060 | | |
| Liquidus Viscosity (P) | 20782 | 30220 | 40765 | 37323 | | |
| Young's Modulus (GPa) | 75.1 | 77.0 | 73.6 | 74.4 | | |
| Non-strengthened Vickers Hardness (kgf/mm$^2$) | 590 | 611 | 563 | 579 | 567 | 591 |
| Ion-exchange | | | | | | |
| 410° C. 8 hr CS (MPa) | 1056 | 1134 | 924 | 1073 | 945 | 972 |
| 410° C. 8 hr DOL (MPa) | 20 | 21 | 26 | 23 | 23 | 23 |
| Diffusivity (cm$^2$/s) | 1.77E−11 | 1.95E−11 | 2.99E−11 | 2.34E−11 | 2.34E−11 | 2.34E−11 |
| 430° C. 8 hr CS (MPa) | 964 | 1072 | 840 | 959 | 846 | 948 |
| 430° C. 8 hr DOL (MPa) | 29 | 31 | 40 | 40 | 30 | 34 |
| Diffusivity (cm$^2$/s) | | | | | | |
| 450° C. 8 hr CS (MPa) | 910 | 992 | 781 | 892 | 806 | 794 |
| 450° C. 8 hr DOL (MPa) | 36 | 36 | 44 | 46 | 36 | 32 |
| Diffusivity (cm$^2$/s) | 5.74E−11 | 5.74E−11 | 8.57E−11 | 9.37E−11 | 5.74E−11 | 5.54E−11 |

|  | Ex. 7 | Ex. 8 | Ex. 9 | Ex. 10 | Ex. 11 | Ex. 12 |
|---|---|---|---|---|---|---|
| Analyzed mol % | | | | | | |
| SiO$_2$ | 61.9 | 63.2 | 63.1 | 57.6 | 64.3 | 60.6 |
| Al$_2$O$_3$ | 8.7 | 11.1 | 8.9 | 10.9 | 9.1 | 11.0 |
| MgO | 7.6 | 5.7 | 5.1 | 6.4 | 6.2 | 6.7 |
| CaO | 4.5 | 3.6 | 6.5 | 7.7 | 3.9 | 4.1 |
| Na$_2$O | 15.0 | 14.2 | 14.0 | 14.9 | 14.2 | 15.2 |
| K$_2$O | 2.0 | 1.8 | 1.9 | 2.0 | 1.8 | 2.0 |
| P$_2$O$_5$ | 0.2 | 0.2 | 0.5 | 0.5 | 0.5 | 0.5 |
| R$_2$O:R'O | 1.40 | 1.72 | 1.36 | 1.20 | 1.58 | 1.59 |
| MgO:CaO | 1.68 | 1.59 | 0.78 | 0.83 | 1.59 | 1.63 |
| P$_2$O$_5$:R'O | 0.02 | 0.03 | 0.04 | 0.03 | 0.05 | 0.05 |
| Density (g/cm3) | 2.487 | 2.502 | 2.299 | 2.527 | 2.494 | 2.498 |
| CTE * 10$^{-7}$ (1/° C.) | 92.8 | 93.3 | 92.4 | 93.4 | 93.8 | 94 |
| Strain Pt. (° C.) | 546 | 565 | 551 | 565 | 541 | 569 |
| Anneal Pt. (° C.) | 591 | 611 | 595 | 609 | 586 | 616 |
| Softening Pt. (° C.) | 797 | 819 | 789 | 804.3 | 784 | 825.3 |
| Temperature (° C.) at Viscosity (poise) | | | | | | |
| 200 | 1495 | 1523 | 1439 | 1458 | 1505 | 1511 |
| 35000 | 1062 | 1093 | 1022 | 1049 | 1064 | 1080 |
| 160000 | 984 | 1015 | 950 | 976 | 985 | 1003 |
| 10000 | 1139 | 1170 | 1093 | 1121 | 1142 | 1156 |
| Liquidus Temperature (° C.) | | | | | | |
| Liquidus Viscosity (P) | | | | | | |
| Young's Modulus (GPa) | | | | | | |
| Non-strengthened Vickers Hardness (kgf/mm$^2$) | 594 | 580 | 594 | 580 | 563 | 595 |
| Ion-exchange | | | | | | |
| 410° C. 8 hr CS (MPa) | 939 | 1041 | 959 | 1097 | 952 | 1049 |
| 410° C. 8 hr DOL (MPa) | 29 | 26 | 25 | 26 | 29 | 27 |
| Diffusivity (cm$^2$/s) | 3.72E−11 | 2.99E−11 | 2.77E−11 | 2.99E−11 | 3.72E−11 | 3.23E−11 |
| 430° C. 8 hr CS (MPa) | 869 | 1015 | 893 | 1011 | 878 | 997 |
| 430° C. 8 hr DOL (MPa) | 39 | 41 | 37 | 36 | 44 | 47 |
| Diffusivity (cm$^2$/s) | | | | | | |
| 450° C. 8 hr CS (MPa) | | 960 | 846 | 965 | 806 | 957 |
| 450° C. 8 hr DOL (MPa) | | 48 | 43 | 43 | 50 | 53 |
| Diffusivity (cm$^2$/s) | | 1.02E−10 | 8.19E−11 | 8.19E−11 | 1.11E−10 | 1.24E−10 |

Comparative Examples 1-18

Comparative Examples 1-18 show glass compositions that are not within the scope of embodiments disclosed herein. The glass compositions of Comparative Examples 1-18 were prepared in the same manner as Examples 1-12, but with the components listed in Table 2 below. Like Examples 1-12, various properties of Comparative Examples 1-18 were measured, and the results of those measurements are shown in Table 2 below.

TABLE 2

|  | Comp. 1 | Comp. 2 | Comp. 3 | Comp. 4 | Comp. 5. | Comp. 6 |
|---|---|---|---|---|---|---|
| Analyzed mol % | | | | | | |
| $SiO_2$ | 70.9 | 68.7 | 66.8 | 64.1 | 61.8 | 59.3 |
| $Al_2O_3$ | 1.1 | 3.0 | 5.0 | 6.9 | 8.9 | 10.9 |
| MgO | 5.8 | 5.9 | 5.6 | 5.7 | 5.7 | 5.7 |
| CaO | 9.3 | 9.2 | 8.9 | 9.0 | 9.0 | 8.9 |
| $Na_2O$ | 12.7 | 13.1 | 13.5 | 14.1 | 14.4 | 15.0 |
| $K_2O$ | 0.2 | 0.2 | 0.2 | 0.2 | 0.2 | 0.2 |
| $P_2O_5$ | 0.0 | 0.0 | 0.0 | 0.0 | 0.0 | 0.0 |
| $R_2O$:R'O | 0.86 | 0.89 | 0.94 | 0.97 | 0.99 | 1.04 |
| MgO:CaO | 0.63 | 0.64 | 0.63 | 0.63 | 0.64 | 0.63 |
| $P_2O_5$:R'O | 0.00 | 0.00 | 0.00 | 0.00 | 0.00 | 0.00 |
| Density (g/cm3) | 2.469 | 2.503 | 2.513 | 2.520 | 2.533 | 2.542 |
| CTE * $10^{-7}$ (1/° C.) | 80.1 | 84.6 | 86.4 | 84.5 | 86.4 | 87.8 |
| Strain Pt. (° C.) | 509 | 519 | 532 | 547 | 562 | 575 |
| Anneal Pt. (° C.) | 553 | 564 | 576 | 591 | 605 | 619 |
| Softening Pt. (° C.) | 740.6 | 750.1 | 761.6 | 778.4 | 793.9 | 804.9 |
| Temperature (° C.) at Viscosity (poise) | | | | | | |
| 200 | 1392 | 1401 | 1406 | 1394 | 1427 | 1427 |
| 35000 | 985 | 986 | 1003 | 1007 | 1025 | 1039 |
| 160000 | 914 | 917 | 932 | 938 | 956 | 970 |
| 10000 | 1055 | 1055 | 1073 | 1075 | 1094 | 1107 |
| Liquidus Temperature (° C.) | | | | | | |
| Liquidus Viscosity (P) | | | | | | |
| Stress Optical Coefficient (nm/mm/MPa) | 27.23 | 27.2 | 26.77 | 27.42 | 26.83 | 26.57 |
| Young's Modulus (GPa) | | | | | | |
| Non-strengthened Vickers Hardness (kgf/mm$^2$) | | | | | | |
| Ion-exchange | | | | | | |
| 410° C. 8 hr CS (MPa) | 695 | 795 | 946 | 988 | 1091 | 1224 |
| 410° C. 8 hr DOL (MPa) | 9 | 9 | 9 | 10 | 12 | 12 |
| Diffusivity (cm$^2$/s) | 3.59E−12 | 3.59E−12 | 3.59E−12 | 4.43E−12 | 6.38E−12 | 6.38E−12 |
| 430° C. 8 hr CS (MPa) | | | | | | |
| 430° C. 8 hr DOL (MPa) | | | | | | |
| Diffusivity (cm$^2$/s) | | | | | | |
| 450° C. 8 hr CS (MPa) | | | | | | |
| 450° C. 8 hr DOL (MPa) | | | | | | |
| Diffusivity (cm$^2$/s) | | | | | | |

|  | Comp. 7 | Comp. 8 | Comp. 9 | Comp. 10 | Comp. 11 | Comp. 12 |
|---|---|---|---|---|---|---|
| Analyzed mol % | | | | | | |
| $SiO_2$ | 65.0 | 72.3 | 72.0 | 71.6 | 72.0 | 65.6 |
| $Al_2O_3$ | 7.1 | 4.0 | 4.9 | 5.0 | 5.1 | 10.9 |
| MgO | 5.5 | 1.2 | 1.5 | 3.0 | 0.1 | 1.6 |
| CaO | 6.9 | 1.8 | 1.5 | 0.0 | 2.9 | 1.5 |
| $Na_2O$ | 13.6 | 15.5 | 15.5 | 15.7 | 15.3 | 15.7 |
| $K_2O$ | 1.9 | 3.5 | 3.8 | 3.8 | 3.8 | 3.8 |
| $P_2O_5$ | 0.0 | 1.7 | 0.9 | 0.9 | 0.9 | 0.9 |
| $R_2O$:R'O | 1.26 | 6.35 | 6.50 | 6.46 | 6.38 | 6.34 |
| MgO:CaO | 0.80 | 0.67 | 1.01 | 76.36 | 0.03 | 1.02 |
| $P_2O_5$:R'O | 0.00 | 0.57 | 0.29 | 0.32 | 0.30 | 0.29 |
| Density (g/cm3) | 2.510 | 2.425 | 2.438 | 2.426 | 2.446 | 2.463 |
| CTE * $10^{-7}$ (1/° C.) | 92.9 | 103.4 | 102.9 | 101.5 | 102.2 | 100.5 |
| Strain Pt. (° C.) | 529 | 449 | 454 | 452 | 462 | 516 |
| Anneal Pt. (° C.) | 575 | 493 | 498 | 497 | 506 | 562 |
| Softening Pt. (° C.) | 764.7 | 717.1 | 697.8 | 704.9 | 702 | 797.1 |
| Temperature (° C.) at Viscosity (poise) | | | | | | |
| 200 | 1425 | 1435 | 1457 | 1483 | 1449 | 1580 |
| 35000 | 1012 | 972 | 974 | 994 | 971 | 1088 |
| 160000 | 936 | 889 | 891 | 908 | 889 | 998 |
| 10000 | 1086 | 1053 | 1057 | 1079 | 1052 | 1176 |

TABLE 2-continued

|  |  |  |  |  |  |  |
|---|---|---|---|---|---|---|
| Liquidus Temperature (° C.) | 1040 | 745 | | | | |
| Liquidus Viscosity (P) | 21205 | | | | | |
| Stress Optical Coefficient (nm/mm/MPa) | | 28.36 | 28.37 | 28.46 | 28.09 | 28.18 |
| Young's Modulus (GPa) | 75.9 | | | | | |
| Non-strengthened Vickers Hardness (kgf/mm$^2$) | 596 | | | | | |
| Ion-exchange | | | | | | |
| 410° C. 8 hr CS (MPa) | 983 | 340 | | | | 687 |
| 410° C. 8 hr DOL (MPa) | 18 | 67 | | | | 66 |
| Diffusivity (cm$^2$/s) | 1.43E−11 | 1.99E−10 | | | | 1.93E−10 |
| 430° C. 8 hr CS (MPa) | 880 | | | | | |
| 430° C. 8 hr DOL (MPa) | 28 | | | | | |
| Diffusivity (cm$^2$/s) | | | | | | |
| 450° C. 8 hr CS (MPa) | 810 | | | | | |
| 450° C. 8 hr DOL (MPa) | 31 | | | | | |
| Diffusivity (cm$^2$/s) | 4.26E−11 | | | | | |

|  | Comp. 13 | Comp. 14 | Comp. 15 | Comp. 16 | Comp. 17 | Comp. 18 |
|---|---|---|---|---|---|---|
| Analyzed mol % | | | | | | |
| $SiO_2$ | 65.3 | 65.3 | 61.3 | 69.2 | 66.5 | 68.1 |
| $Al_2O_3$ | 10.9 | 11.0 | 7.0 | 7.3 | 7.0 | 7.1 |
| MgO | 3.2 | 0.1 | 6.7 | 5.0 | 6.3 | 5.4 |
| CaO | 0.0 | 3.0 | 7.9 | 3.3 | 3.5 | 3.2 |
| $Na_2O$ | 15.7 | 15.7 | 14.8 | 13.1 | 14.1 | 13.5 |
| $K_2O$ | 3.9 | 4.0 | 2.0 | 1.8 | 2.6 | 2.4 |
| $P_2O_5$ | 1.0 | 1.0 | 0.2 | 0.3 | 0.0 | 0.2 |
| $R_2O$:R'O | 6.08 | 6.44 | 1.15 | 1.79 | 1.71 | 1.85 |
| MgO:CaO | 70.08 | 0.03 | 0.85 | 1.54 | 1.79 | 1.68 |
| $P_2O_5$:R'O | 0.31 | 0.32 | 0.02 | 0.03 | 0.00 | 0.03 |
| Density (g/cm3) | 2.448 | 2.478 | 2.513 | 2.47 | 2.465 | 2.467 |
| CTE * 10$^{-7}$ (1/° C.) | 100.1 | 102.6 | 96.4 | 89 | 92.9 | 93.7 |
| Strain Pt. (° C.) | 523 | 515 | 529 | 533 | 522 | 521 |
| Anneal Pt. (° C.) | 571 | 561 | 574 | 580 | 568 | 567 |
| Softening Pt. (° C.) | 806.2 | | 762.7 | 789 | 778.4 | 773.4 |
| Temperature (° C.) at Viscosity (poise) | | | | | | |
| 200 | 1604 | 1553 | 1420 | 1480 | 1481 | 1490 |
| 35000 | 1117 | 1067 | 1006 | 1044 | 1036 | 1042 |
| 160000 | 1026 | 978 | 932 | 965 | 956 | 962 |
| 10000 | 1205 | 1153 | 1078 | 1121 | 1115 | 1121 |
| Liquidus Temperature (° C.) | | | | | | |
| Liquidus Viscosity (P) | | | | | | |
| Stress Optical Coefficient (nm/mm/MPa) | 28.94 | | 26.91 | | | 27.21 |
| Young's Modulus (GPa) | | | | | | |
| Non-strengthened Vickers Hardness (kgf/mm$^2$) | | | | 557 | 559 | |
| Ion-exchange | | | | | | |
| 410° C. 8 hr CS (MPa) | 714 | | 669 | 862 | 820 | 700 |
| 410° C. 8 hr DOL (MPa) | 76 | | 17 | 28 | 37 | 30 |
| Diffusivity (cm$^2$/s) | 2.56E−10 | | 1.28E−11 | 3.47E−11 | 6.06E−11 | 3.99E−11 |
| 430° C. 8 hr CS (MPa) | | | | 763 | 772 | |
| 430° C. 8 hr DOL (MPa) | | | | 38 | 50 | |
| Diffusivity (cm$^2$/s) | | | | | | |
| 450° C. 8 hr CS (MPa) | | | | 676 | | |
| 450° C. 8 hr DOL (MPa) | | | | 49 | | |
| Diffusivity (cm$^2$/s) | | | | 1.06E−10 | | |

Comparative Examples 1-7 show soda-lime silicate glasses with varying amounts of $SiO_2$, $Al_2O_3$, and $Na_2O$. The components were varied in an attempt to increase both compressive stress and depth of the compressive stress layer (DOL). However, as shown in these comparative examples, it was not possible to achieve a compressive stress above 800 MPa and a DOL greater than or equal to 20 μm by varying $SiO_2$, $Al_2O_3$, and $Na_2O$ alone.

However, in Examples 1 and 2 $K_2O$ was substituted for CaO to increase the DOL. Examples 4 and 5 had a $K_2O$ amount similar to Examples 1 and 2, but decreased the amount of CaO in the glass compositions while increasing MgO and $SiO_2$. Examples 4 and 5 also had compressive stresses above 800 MPa and DOLs greater than 20 μm. Further, Examples 4 and 5 had greater DOLs than Examples 1 and 2.

Comparative Examples 8-10 introduced $P_2O_5$ into a soda-lime silicate glass composition to increase the DOL. The DOL of Comparative Examples 8-10 was increased when compared to Comparative Examples 1-7, but the compressive stress of Comparative Examples 8-10 was well below 800 MPa. Comparative Examples 11-18 varied the amount of $Al_2O_3$ to improve both compressive stress and DOL, while they also varied the amounts of CaO, MgO, and $P_2O_5$. However, none of Comparative Examples 11-15 and 18 had both a compressive stress above 800 MPa and a DOL greater than or equal to 20 μm, and Comparative Examples 17 and 18 did not have compressive stress above 800 when ion-exchanged at 430° C. or 450° C. for eight hours.

In contrast, Examples 7-15 introduced low amounts of $P_2O_5$ and varied the amounts of $Al_2O_3$, MgO, and CaO. The low amounts of $P_2O_5$ increased the DOL of these examples to greater than 20 µm, and the balancing of $Al_2O_3$, MgO, and CaO provided compressive stresses above 800 MPa. However, as shown in Comparative Examples 14 and 15 merely lowering the amount of $P_2O_5$ from that in Comparative Examples 7-13 did not result in a compressive stress greater than or equal to 800 MPa and a DOL greater than or equal to 20 µm. Rather, in Examples 7-15, the effects of at least $SiO_2$, $Al_2O_3$, $Na_2O$, $K_2O$, MgO, CaO, and $P_2O_5$ were balanced to yield a glass composition that has a compressive stress greater than or equal to 800 MPa and a DOL greater than or equal to 20 µm.

In addition to the properties shown in Tables 1 and 2, each of the glass compositions in the examples was capable of being formed into glass articles by low-cost methods traditionally available only to soda-lime silicate glasses. Accordingly, the glass compositions of Examples 1-15 were capable of providing high mechanical strength, similar to an aluminosilicate glass composition, at a low cost, similar to a soda-lime silicate glass composition.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass article consisting of:
    from greater than or equal to 57 mol % to less than or equal to 67 mol % $SiO_2$;
    from greater than or equal to 7 mol % to less than or equal to 11 mol % $Al_2O_3$;
    from greater than or equal to 14 mol % to less than or equal to 16 mol % $Na_2O$;
    from greater than or equal to 1.8 mol % to less than or equal to 2.0 mol % $K_2O$;
    from greater than or equal to 5 mol % to less than or equal to 8 mol % MgO;
    from greater than or equal to 3 mol % to less than or equal to 8 mol % CaO;
    from greater than or equal to 0 mol % to less than or equal to 0.5 mol % $P_2O_5$,
    optionally SrO, BaO, ZnO, $SnO_2$, $As_2O_3$, $Sb_2O_3$, $Cl^-$, $TiO_2$, and $ZrO_2$;
    an $R_2O$:R'O molar ratio of from greater than or equal to 1.2:1 to less than or equal to 1.8:1, wherein $R_2O$ is the total amount of $Na_2O$ and $K_2O$ in mol %, and R'O is the total amount of MgO, CaO, SrO, BaO, and ZnO in mol %;
    an MgO:CaO molar ratio of from greater than or equal to 0.7:1 to less than or equal to 1.8:1;
    a compressive stress layer on at least one surface thereof, the compressive stress layer having a compressive stress that is greater than or equal to 800 MPa, wherein a depth of the compressive stress layer is greater than or equal to 20 µm;
    a strain point from greater than or equal to 525° C. to less than or equal to 575° C.; and
    a coefficient of thermal expansion of less than $97 \times 10^{-7}$° $C.^{-1}$ in the temperature range of 25° C. to 300° C.

2. The glass article of claim 1, wherein the depth of the compressive stress layer is from greater than or equal to 20 µm to less than or equal to 80 µm.

3. The glass article of claim 1, wherein the glass article includes from greater than or equal to 57 mol % to less than or equal to 65 mol % $SiO_2$.

4. The glass article of claim 1, wherein the glass article includes from greater than or equal to 15 mol % to less than or equal to 16 mol % $Na_2O$.

5. The glass article of claim 1, wherein the compressive stress of the compressive stress layer is from greater than or equal to 950 MPa to less than or equal to 1,500 MPa.

6. The glass article of claim 1, wherein the glass article has a $P_2O_5$:R'O molar ratio of from greater than or equal to 0:1 to less than or equal to 0.1:1.

7. The glass article of claim 1, wherein the glass article includes from greater than or equal to 0.001 mol % to less than or equal to 0.200 mol % $SnO_2$.

8. The glass article of claim 1, wherein the glass article has an $R_2O$:$Al_2O_3$ molar ratio of from greater than or equal to 1.3:1 to less than or equal to 2.3:1.

9. The glass article of claim 1, wherein a temperature at which the glass article has a viscosity of 10,000 poise is from greater than or equal to 1,000° C. to less than or equal to 1,200° C.

10. The glass article of claim 1, wherein sodium and potassium interdiffusivity of the glass article is from greater than or equal to $1.4 \times 10^{-11}$ $cm^2/s$ to less than or equal to $400 \times 10^{-11}$ $cm^2/s$ when ion-exchanged at 410° C.

11. The glass article of claim 1, wherein the glass article has a Vickers Hardness of from greater than or equal to 540 $kgf/mm^2$ to less than or equal to 640 $kgf/mm^2$.

12. The glass article of claim 1, wherein the glass article has a $P_2O_5$:R'O molar ratio of from greater than or equal to 0:1 to less than or equal to 0.05:1.

* * * * *